United States Patent
Yang

(10) Patent No.: US 9,667,929 B2
(45) Date of Patent: May 30, 2017

(54) DISPLAY UNIFORMITY COMPENSATION METHOD, OPTICAL MODULATION APPARATUS, SIGNAL PROCESSOR, AND PROJECTION SYSTEM

(71) Applicant: APPOTRONICS CHINA CORPORATION, Shenzhen (CN)

(72) Inventor: Chengde Yang, Shenzhen (CN)

(*) Notice: Subject to any disclaimer, the term of this patent is extended or adjusted under 35 U.S.C. 154(b) by 18 days.

(21) Appl. No.: 14/889,772

(22) PCT Filed: May 7, 2014

(86) PCT No.: PCT/CN2014/076925
§ 371 (c)(1),
(2) Date: Nov. 6, 2015

(87) PCT Pub. No.: WO2014/180309
PCT Pub. Date: Nov. 13, 2014

(65) Prior Publication Data
US 2016/0112690 A1    Apr. 21, 2016

(30) Foreign Application Priority Data
May 8, 2013    (CN) .......................... 2013 1 0167229

(51) Int. Cl.
G09G 3/34    (2006.01)
H04N 9/31    (2006.01)
(Continued)

(52) U.S. Cl.
CPC ......... H04N 9/3182 (2013.01); G03B 21/204 (2013.01); G03B 33/08 (2013.01);
(Continued)

(58) Field of Classification Search
CPC .... G09G 3/3466; G09G 3/346; G09G 3/3406; G09G 2320/0233; G09G 2320/0242;
(Continued)

(56) References Cited

U.S. PATENT DOCUMENTS 7,050,122 B2    5/2006 Gibbon et al.
9,542,911 B2 *  1/2017 Tsukagoshi .............. G09G 5/10
(Continued)

FOREIGN PATENT DOCUMENTS

CN    102136255 A    7/2011
CN    102355561 A    2/2012
(Continued)

OTHER PUBLICATIONS

Supplementary European Search Report in EP 14794652, dated Apr. 5, 2016.
(Continued)

*Primary Examiner* — Patrick F Marinelli
(74) *Attorney, Agent, or Firm* — Chen Yoshimura LLP

(57) ABSTRACT

Disclosed are a display uniformity compensation method, an optical modulation apparatus, a signal processor, and a projection system. The method comprises: acquiring original image data and an optical loss coefficient a of a compensation region, acquiring t1 and t2, and making $t2/t1=f \cdot a/(1-a)$, where $0<f<=1$, and $t1+t2=T$; determining full region image data and compensation image data through the original image data, t1, t2, and a, within time T when a frame of an image is being modulated, acquiring original light with a period of time t1, and performing modulation on the original light according to the full region image data; and acquiring compensation light within a period of time t2, other than the period of time t1, within the time T, and performing modulation on the compensation light according to the compensation image data. An embodiment of the present invention provides a method for improving a uniformity degree of brightness of an image on a display unit.

16 Claims, 9 Drawing Sheets

(51) Int. Cl.
*G03B 21/20* (2006.01)
*G03B 33/08* (2006.01)

(52) U.S. Cl.
CPC ........... *G09G 3/346* (2013.01); *G09G 3/3406* (2013.01); *G09G 3/3466* (2013.01); *G09G 2320/0233* (2013.01); *G09G 2320/0242* (2013.01); *G09G 2320/06* (2013.01); *G09G 2320/062* (2013.01); *G09G 2320/0626* (2013.01); *G09G 2320/0646* (2013.01)

(58) Field of Classification Search
CPC ......... G09G 2320/06; G09G 2320/062; G09G 2320/0646
See application file for complete search history.

(56) References Cited

U.S. PATENT DOCUMENTS

2004/0001184 A1  1/2004  Gibbons et al.
2007/0035707 A1  2/2007  Margulis
2014/0085346 A1* 3/2014  Tsukagoshi .............. G09G 5/10
                                                    345/690

FOREIGN PATENT DOCUMENTS

| CN | 103024320 A | 4/2013 |
| CN | 103327275 A | 9/2013 |
| WO | 0203687 A2  | 1/2002 |

OTHER PUBLICATIONS

International Search Report in the parent PCT application No. PCT/CN2014/076925, dated Aug. 20, 2014.

IPRP in the parent PCT application No. PCT/CN2014/076925, dated Nov. 10, 2015.

* cited by examiner

Acquiring an original image data and an optical loss coefficient a of a compensation region, where the grayscale value of the original image data corresponding to an arbitrary point A in a non-compensation region of the display unit is u, and that corresponding to an arbitrary point B in a predetermined compensation region of the display unit is v.

↓

Acquiring $t_1$ and $t_2$, such that $t_2/t_1 = f*a/(1-a)$, where $0 < f < 1$, $t_1 + t_2 = T$.

↓

Acquiring m and n, such that $m*t_1/T + n*t_2/T = u*t_1/T$, where $n = m*x$, $x = 0$.

↓

Determining a full region image data and a compensation image data based on m, n, and v, where the grayscale value of the full region image data corresponding to the point A is m and that corresponding to the point B is v, and where the grayscale value of the compensation image data corresponding to the point A is n and that corresponding to the point B is q, where $q = v$.

↓

Within a time period T when a frame of image is being modulated, within the time period $t_1$, acquiring an original light and modulating the original light according to the full region image data, and within the time period $t_2$, which is a time period within the time period T other than the time period $t_1$, acquiring a compensation light and modulating the compensation light according to the compensation image data; the flux of the compensation light is d times the flux of the original light, $d = (t_1*a)/[t_2*(1-a)]$.

Fig. 5

Acquiring an original image data and an optical loss coefficient matrix of a compensation region; the optical loss coefficient value of a pixel B1 of the optical loss coefficient matrix is denoted the optical loss coefficient a of the compensation region. The grayscale value of the original image data corresponding to an arbitrary point A in a non-compensation region of the display unit is u, that corresponding to the pixel B1 in the predetermined compensation region of the display unit is v1, and that corresponding to another arbitrary pixel B2 in the predetermined compensation region of the display unit is v2. The optical loss coefficient of the optical loss coefficient matrix corresponding to the pixel B1 is a1, and that corresponding to the pixel B2 is a2.

↓

Acquiring t1 and t2, where $t1=T*(1-a)$, $t2=a*T$.

↓

Acquiring m and n, such that $m*t1/T+n*t2/T=u*t1/T$, where at least two of m, n and u satisfy a predetermined relationship.

↓

Acquiring predetermined grayscale compensation values p, where the grayscale compensation value for the compensation image data corresponding to the pixel B1 is $p1=0$, and that corresponding to the pixel B2 is $p2=[y0]$, where $y0=[t1*v2-T*v2*(1-a)]/t2$.

↓

Determining a full region image data and a compensation image data based on m, n, p1, p2 and v, where the grayscale value of the full region image data corresponding to the point A is m and that corresponding to the point B is v, and where the grayscale value of the compensation image data corresponding to the point A is n, that corresponding to the pixel B1 is v, and that corresponding to the pixel B2 is v+p2.

↓

Within a time period T when a frame of image is being modulated, within the time period t1, acquiring an original light and modulating the original light according to the full region image data, and within the time period t2, which is a time period within the time period T other than the time period t1, acquiring a compensation light and modulating the compensation light according to the compensation image data. The original light and the compensation light have the same flux.

Fig. 7

DISPLAY UNIFORMITY COMPENSATION METHOD, OPTICAL MODULATION APPARATUS, SIGNAL PROCESSOR, AND PROJECTION SYSTEM

BACKGROUND OF THE INVENTION

Field of the Invention

This invention relates to illumination and display fields, and in particular, it relates to a display uniformity compensation method, an optical modulation device, a signal processor, and a projection system.

Description of Related Art

Projection devices are widely used in cinemas, meetings, advertisement and other application fields. Optical modulation techniques in projection devices are generally divided into three light valve modulation and single light valve modulation techniques. A typical projection system using single light valve modulation includes a red light source, a green light source and a blue light sources for respectively generate a red (R) light, a green (G) light and a blue (B) light, and a light valve for modulating the red, green and blue lights to generate a light beam representing a color image, and a projection lens for projecting the light beam of the color image which has been modulation by the light valve on a screen to produce a color image. The red, green and blue light beams may be (but without limitation) guided by reflectors to a light combining prism, and the combined light is output to the light valve. The light valve may be a MEMS (micro-electro-mechanical system) device, such as a light valve using digital light processing (DLP) technology provided by Texas Instrument.

The signal processor receives at least on frame of image signal, converts it to image data, and outputs the image data to the light valve; meanwhile, it controls the respective light sources and the light valve by their drive signals, so that the light valve modulates the corresponding color light beams based on the received image data. For example, when the signal processor sends the red image data of a frame of image data to the light valve, the red light source is turned on to emit red light; similarly, when the signal processor sends the green or blue image data of a frame of image data to the light valve, the green or blue light source is turned on to emit green or blue light. When the signal processor sends white/gray image data of a frame of image data to the light valve, all of the red, green and blue light sources are turned on.

This way, using a light valve to modulate a color light sequence of rapid periodically repeating red, green and blue monochromatic lights, a corresponding periodically repeating red, green and blue primary color image sequence is obtained; the primary color image sequence is projected onto a screen by projection lenses. As long as the speed of change of the image sequence is sufficiently fast, human eyes cannot distinguish individual primary color images, and the three primary color images are combined into a moving image due to the persistence of vision of human eyes.

In a projection display system that uses the three light valve modulation technique, three light valves are used to respectively modulate the red, green and blue primary colors, to generate monochromatic images of each primary color. The monochromatic images are then combined into a color image using dichroic filters or other light combining devices, and projected onto a screen by a projection lens.

Regardless of the type of projection devices, all lights are modulated by light valves and then projected on to the screen by projection lenses. However, when the light modulated by the light valve is transmitted through the projection lenses, large angle lights often experience losses, so the brightness of the image in the four corner regions of the screen is typically lower than that in the center region. This is troublesome for many application. For example, when multiple display units are pieced together to form a display wall, the above problem will cause inconsistent brightness and color of the display wall, so that the display has a patchy appearance, affecting the visual effect.

One commonly used solution to the above problem is to process the input signal, to lower the grayscale values in the center region of the display unit to reduce the image brightness of the center region of the display unit, thereby improving the uniformity of each display unit. When piecing the units together, the brightness of each of the multiple display units is adjusted based on the brightness of the least bright display unit, to achieve consistency of the entire display wall. However, this solution reduces the dynamic range of the display.

SUMMARY

Embodiments of the present invention solve the above technical problem by providing a method for improving the uniformity of image brightness of a display unit.

Embodiments of the present invention provide a display uniformity compensation method, which includes the following steps:

S11: Acquiring an original image data and an optical loss coefficient a of a compensation region, where the grayscale value of the original image data corresponding to an arbitrary point A in a non-compensation region of the display unit is u, and that corresponding to an arbitrary point B in the predetermined compensation region of the display unit is v;

S12: Acquiring t1 and t2, such that $t2/t1=f*a/(1-a)$, where $0<f\leq 1$, and $t1+t2=T$;

S13: Acquiring m and n, such that $m*t1/T+n*t2/T=u*t1/T$, and where at least two values among m, n and u satisfy a predetermined relationship;

S14: Determining a full region image data and a compensation image data based on m, n and v, where the grayscale value of the full region image data corresponding to the point A is m and that corresponding to the point B is v, and where the grayscale value of the compensation image data corresponding to the point A is n and that corresponding to the point B is q, where $q\geq v$, and where q and v satisfy a predetermined relationship;

S15: Within a time period T when a frame of image is being modulated, within the time period t1, acquiring an original light and modulating the original light according to the full region image data; and within a time period t2, which is a time period within the time period T other than the time period t1, acquiring a compensation light and modulating the compensation light according to the compensation image data.

Preferably, $t2/t1=a/(1-a)$, $q=v$, and the original light and the compensation light have the same flux.

Preferably, $t2/t1<a/(1-a)$, and the original light and the compensation light have the same flux;

Where step S14 further includes acquiring a predetermined grayscale compensation value p, where $0<p\leq[y0]$, $y0=(t1*v*a)[t2*(1-a)]-v$; $q=v+p$.

Preferably, $t2/t1<a/(1-a)$, $n=0$, $m=u$, $q=v$, and the flux of the compensation light is d times that of the original light; $d=(t1*a)/[t2*(1-a)]$.

Preferably, t2/t1<a/(1−a), n=0, m=u, and the flux of the compensation light is d times that of the original light;

Where step S14 further includes acquiring a predetermined grayscale compensation value p, where 0<p≤[y0], y0=(t1*v*a)(d+t2)−v; q=v+p.

Preferably, in step S11, acquiring the optical loss coefficient a of the compensation region includes: acquiring an optical loss coefficient matrix of the compensation region, and taking the optical loss coefficient of a pixel B1 in the optical loss coefficient matrix as the optical loss coefficient a; where the grayscale value of the original image data corresponding to the pixel B1 of the predetermined compensation region of the display unit is v1, and that corresponding to an arbitrary other pixel B2 of the predetermined compensation region is v2; the optical loss coefficient of the optical loss coefficient matrix corresponding to the pixel B1 is a1, and the optical loss coefficient corresponding to the pixel B2 is a2;

$$t2/t1=a/(1-a);$$

Where step S14 further includes acquiring predetermined grayscale compensation values, where the grayscale compensation value p of the compensation image data corresponding to the pixel B1 is p=0, and the grayscale compensation value p corresponding to the pixel B2 is p=[y0], where y0=[t1*v2−T*v2*(1−a2)]/t2; q=v+p;

Where the original light and the compensation light have the same flux.

Preferably, the optical loss coefficient of the pixel B1 is a median value of the optical loss coefficient matrix.

Preferably, n=0.

Another embodiment of the invention provides an optical modulation device, including:

A signal processor, for: acquiring an original image data and an optical loss coefficient a of a compensation region, where the grayscale value of the original image data corresponding to an arbitrary point A in a non-compensation region of the display unit is u, and that corresponding to an arbitrary point B in the predetermined compensation region of the display unit is v; acquiring t1 and t2, such that t2/t1=f*a/(1−a), where 0<f≤1, and t1+t2=T; acquiring m and n, such that m*t1/T+n*t2/T=u*t1/T, and where at least two values among m, n and u satisfy a predetermined relationship; and determining a full region image data and a compensation image data based on m, n and v, where the grayscale value of the full region image data corresponding to the point A is m and that corresponding to the point B is v, and where the grayscale value of the compensation image data corresponding to the point A is n and that corresponding to the point B is q, where q≥v, and where q and v satisfy a predetermined relationship;

An optical modulator unit, for: within a time period T when a frame of image is being modulated, acquiring an original light within a time period t1, and modulating the original light according to the full region image data from the signal processor; and within a time period t2, which is a time period within the time period T other than the time period t1, acquiring a compensation light and modulating the compensation light according to the compensation image data from the signal processor.

Preferably, t2/t1=a/(1−a), q=v.

Preferably, the signal processor further acquires an optical loss coefficient matrix of the compensation region, and takes the optical loss coefficient of a pixel B1 in the optical loss coefficient matrix as the optical loss coefficient a; where the grayscale value of the original image data corresponding to the pixel B1 of the predetermined compensation region of the display unit is v1, and that corresponding to an arbitrary other pixel B2 of the predetermined compensation region is v2; the optical loss coefficient of the optical loss coefficient matrix corresponding to the pixel B1 is a1, and the optical loss coefficient corresponding to the pixel B2 is a2;

$$t2/t1=a/(1-a);$$

The signal processor further acquires a predetermined grayscale compensation value, where the grayscale compensation value p of the compensation image data corresponding to the pixel B1 is p=0, and the grayscale compensation value p corresponding to the pixel B2 is p=[y0], where y0=[t1*v2−T*v2*(1−a2)]/t2; q=v+p.

Preferably, the optical loss coefficient of the pixel B1 is a median value of the optical loss coefficient matrix.

Another embodiment of the present invention provides a signal processor, which includes:

A first acquiring module, for acquiring an original image data and an optical loss coefficient a of a compensation region, where the grayscale value of the original image data corresponding to an arbitrary point A in a non-compensation region of the display unit is u, and that corresponding to an arbitrary point B in the predetermined compensation region of the display unit is v; and acquiring t1 and t2, such that t2/t1=f*a/(1−a), where 0<f≤1, and t1+t2=T;

A second acquiring module, for acquiring m and n, such that m*t1/T+n*t2/T=u*t1/T, and where at least two values among m, n and u satisfy a predetermined relationship;

A determination module for determining a full region image data and a compensation image data based on m, n and v, where the grayscale value of the full region image data corresponding to the point A is m and that corresponding to the point B is v, and where the grayscale value of the compensation image data corresponding to the point A is n and that corresponding to the point B is q, where q≥v, and where q and v satisfy a predetermined relationship.

Another embodiment of the present invention provides a projection system, which includes:

A light source system, including an original light source and a compensation light source, for respectively generating an original light and a compensation light which are output sequentially from a common light path;

An optical modulation device, for: acquiring an original image data and an optical loss coefficient a of a compensation region, where the grayscale value of the original image data corresponding to an arbitrary point A in a non-compensation region of the display unit is u, and that corresponding to an arbitrary point B in the predetermined compensation region of the display unit is v; acquiring t1 and t2, such that t2/t1=f*a/(1−a), where 0<f≤1, and t1+t2=T; acquiring m and n, such that m*t1/T+n*t2/T=u*t1/T, and where at least two values among m, n and u satisfy a predetermined relationship; determining a full region image data and a compensation image data based on m, n and v, where the grayscale value of the full region image data corresponding to the point A is m and that corresponding to the point B is v, and where the grayscale value of the compensation image data corresponding to the point A is n and that corresponding to the point B is q, where q≥v, and where q and v satisfy a predetermined relationship; within a time period T when a frame of image is being modulated, acquiring an original light within a time period t1, and modulating the original light according to the full region image data; and within a time period t2, which is a time period within the time period T other than the time period t1, acquiring a compensation light and modulating the compensation light according to the compensation image data; and A projection lens, for projecting the light beam that has been modulated by the optical modulating system to a predetermined plane.

Preferably, $t2/t1 < a/(1-a)$, $n=0$, $m=u$, $q=v$, and the flux of the compensation light is d times that of the original light, $d=(t1*a)/[t2*(1-a)]$.

Preferably, $t2/t1 < a/(1-a)$, $n=0$, $m=u$, and the flux of the compensation light is d times that of the original light;

The optical modulation device further acquires a predetermined grayscale compensation value p, where $0 < p \le [y0]$, $y0=(t1*v*a)/(d+t2)-v$; where $q=v+p$.

Compared to conventional technology, embodiments of the present invention have the following advantages:

In the present embodiments, by performing brightness compensation for the compensation region, the brightness of the compensation region is closer to the brightness of the non-compensation region; so the uniformity of image brightness of the display unit can be enhanced without reducing the grayscale value of the non-compensation region of the display unit, while avoiding a reduction of the dynamic range of the displayed image.

BRIEF DESCRIPTION OF THE DRAWINGS

FIG. 5 is a flowchart of a display uniformity compensation method according to another embodiment of the present invention;

FIG. 7 is a flowchart of a display uniformity compensation method according to another embodiment of the present invention;

DETAILED DESCRIPTION OF PREFERRED EMBODIMENTS

Current image projection system commonly uses red, green and blue as the three primary colors. To improve gamut, in the television and cinema fields, six primary colors with the addition of yellow, magenta and cyan colors have also been used. In the printing field, yellow, magenta and cyan may be used as the three primary colors. For convenience of description, in the present embodiments, red, green and blue are used as the three primary colors, but the invention is not limited to these primary colors.

Embodiments of the present invention are described below with reference to the drawings.

First Embodiment

Figure 1:
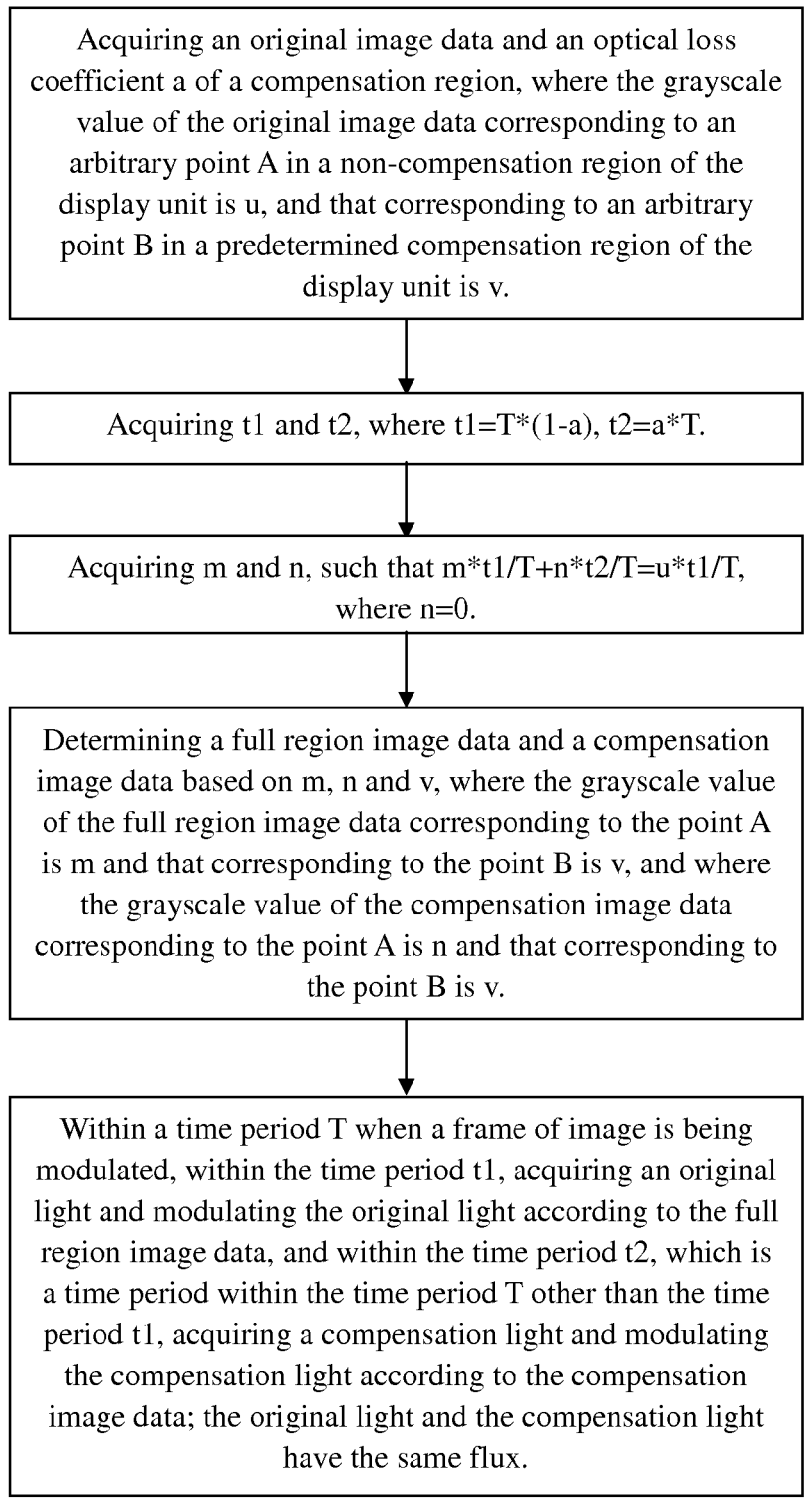
FIG. 1 is a flowchart of a display uniformity compensation method according to an embodiment of the present invention.

Refer to FIG. 1, which is a flowchart of a display uniformity compensation method according to an embodiment of the present invention. As shown in FIG. 1, this embodiment includes the following method steps:

S11: Acquiring an original image data and an optical loss coefficient a of a compensation region, where the grayscale value of the original image data corresponding to an arbitrary point A in a non-compensation region of the display unit is u, and that corresponding to an arbitrary point B in a predetermined compensation region of the display unit is v.

In a projection system of current technology, the optical modulation device typically includes a signal processor and an optical modulator unit, where the optical modulator unit includes multiple independently controllable pixel units, such as micro-vibration mirror units or liquid crystal units. The signal processor acquires image signal inputted from the user and converts it to image data, or directly acquires image data. The optical modulator unit receives the image data from the signal processor, so that each pixel units of the optical modulator unit can modulate the light beam passing through that pixel unit based on the image data corresponding to that pixel, to generate a pixel on the display unit corresponding to the pixel unit which has the predetermined brightness and predetermined color. For clarity, in the following descriptions, the actor of various actions is the signal processor, except that the actor of optical modulation is the optical modulator unit.

Of course, in practical applications, the optical modulator unit and the signal processor can be integrated into one device, referred to as the optical modulation device; in that case, the actor of the various actions described below is the optical modulation device.

The time period used by the optical modulator unit to modulate each frame of image is the same and fixed, denoted as T. In practice, the time period T is typically ¹⁄₂₄ second. In this embodiment, original image data refers to the image data that the user supplies and wishes to have displayed on the display unit.

The light beams carrying the image, which has been modulated by the optical modulation device, are projected by the projecting lens to the display unit. However, in practice, the image brightness in edge regions of the display unit is lower than the image brightness in the center region. The inventors of the present invention recognized that this is because when the light beams after the modulator passes through the projection lens, larger angle lights experiences a loss; therefore, the edge regions of the display unit corresponding to large angle lights has lower image brightness. This phenomenon is more noticeable in display walls formed by multiple display units pieced together. Because in each display unit of the display wall the edge region has lower image brightness than the center region, the brightness difference within the image formed by the multiple display units results in poor overall brightness uniformity of the display wall and poor display effect.

In embodiments of the present invention, by performing image brightness compensation for edge regions of the display units, the brightness of the edge regions is made closer to the brightness of the center regions, which avoids reducing the dynamic range of the image while improving the image brightness uniformity.

In different projection systems, the losses experienced by the modulated light beams when projected to the display unit by the projection lens are different, therefore the sizes of the edge regions of the display unit that requires brightness compensation are different for different projection systems. Moreover, in some situations, regions that require brightness compensation include other regions in addition to the edge regions. To determine the compensation regions, the following method steps may be used to determine the location of the compensation region and to determine the optical loss coefficient for each pixel in the compensation region:

1. Inputting a specific image signal, which represents the expected brightness of each pixel of the display unit. For example, the image signal may represent that all pixels of the display unit are expected to have the same brightness.

2. Collecting an actual brightness distribution of the pixels of the display unit when the specific image signal is displayed.

In practice, the display unit may be divided into segments, e.g. 3*3=9 segments, and the brightness of a point in each segment (e.g. the center of each segment) is collected. For convenience, in the following descriptions the distribution for each pixel is used, but in practice each pixel may be replaced by a segment.

3. Calculating the difference value between the actual brightness and the expected brightness for each pixel of the display unit; the positions of the display unit where the difference value is greater than a threshold are set to be the compensation region. In practical applications, the compensation region on the display unit may be formed of at least two disconnected compensation sub-regions, such as sub-regions formed by four corner regions of the display unit; or it may be formed of one contiguous region, such as the edge region surrounding the center.

Of course, in practice, the compensation region does not have to be acquired through calculation; rather, its location can be pre-defined and stored in a storage unit, where the signal processor directly acquires the location of the compensation region from the storage unit.

4. Calculating the optical loss coefficient (denoted a) of the compensation region, which is defined as the percentage of lost brightness to the expected brightness for a particular position. The optical loss coefficient of each pixel within the compensation sub-regions may be calculated, and then their average is calculate and used as the optical loss coefficient of that compensation region. Alternatively, rather than measuring the optical loss coefficient of each pixel in the sub-regions, the optical loss coefficient of one pixel within each sub-region (i.e. the pixel at the center of the sub-region) may be measured and used directly as the optical loss coefficient of the sub-region, and the optical loss coefficient of the sub-regions are averaged and used as the optical loss coefficient of the compensation region. As another alternative, the optical loss coefficient of an arbitrary point in the compensation region is measured and directly used as the optical loss coefficient of the compensation region.

Of course, in practice, the optical loss coefficient of the compensation region does not have to be acquired through calculation; rather, it can be pre-defined and stored in the storage unit, where the signal processor directly acquires the optical loss coefficient of the compensation region from the storage unit.

S12: Acquiring t1 and t2, where t1=T*(1−a), t2=a*T.

S13: Acquiring m and n, such that m*t1/T+n*t2/T=u*t1/T, where n=0.

S14: Determining a full region image data and a compensation image data based on m, n and v, where the grayscale value of the full region image data corresponding to the point A is m and that corresponding to the point B is v, and where the grayscale value of the compensation image data corresponding to the point A is n and that corresponding to the point B is q, where q=v.

In this embodiment, by performing image brightness compensation for the edge region of the display unit, the brightness in the edge region and the center region are the same or close to each other. Therefore, take the time period T, which is used in current technology to modulate a frame of image data in the original image data, the time period T is divided into two parts, which are time periods t1 and t2, respectively, where t1+t2=T. Within the time period t1, the full region image data is used for modulation, and within time period t2, the compensation image data is used for modulation.

Specifically, in this embodiment, the full region image data is the same as the original image data, while the compensation image data is the same as the original image data in the compensation region but is zero in the non-compensation region. Therefore, in this embodiment, when determining the full region image data and the compensation image data, the values n=0 and u=m are pre-stored in the storage unit, and the signal processor directly acquires such values form the storage unit. Of course, in practice, these values can be inputted by the user in real time, and the signal processor can acquire the data inputted by the user.

Within the time period t for modulating a frame of image, assuming there is no light loss, the image brightness (denoted E1) of a point on the display unit is equal to the light energy entering the optical modulation device within the time period t (denoted E2) multiplied by the ratio of the grayscale value of that point to the total grayscale value (denoted e). The light energy E2 is the product of the flux (denoted Φ) and the time period t. Therefore, when the flux Φ remains constant, the image brightness of a point on the display unit is proportional to the modulation time period. The longer the modulation time period, the more light is projected to that point, and the higher the brightness.

Therefore, within time period T, in the time period t1 when the full region image data is used for modulation, the actual brightness in the non-compensation region is Φ*t1*m/e, and the actual brightness in the compensation region is Φ*t1*v/e*(1−a). In the time period t2 when the compensation image data is used for modulation, the actual brightness in the non-compensation region is Φ*t2*n/e, and the actual brightness in the compensation region is Φ*t2*v/e*(1−a). It follows that within the time period T when the optical modulation device performs modulation using the full region image data and the compensation image data, the actual brightness in the non-compensation region of the display unit is Φ*t1*m/e+Φ*t2*n/e, and the actual brightness in the compensation region is Φ*t1*v/e*(1−a)+Φ*t2*v/e*(1−a)=Φ*T*v/e*(1−a).

In this embodiment, u=m and n=0. Therefore the compensation method of this embodiment is essentially: Divide the time period T for modulating a frame of the original image data into two parts, t1 and t2, then in time period t2, the image data in the non-compensation region is deleted, so that in the time period t2 the non-compensation region does not display an image. Thus, the actual brightness of the non-compensation region is Φ*t1*u/e, not Φ*T*u/e, i.e., Φ*t1*m/e+Φ*t2*n/e=Φ*t1*u/e; the actual brightness of the compensation region is Φ*T*v/e*(1−a).

When the brightness of all pixels of the display unit is uniform, i.e. when u=v, to make the actual brightness of the compensation region of the display unit equal to the actual brightness of the non-compensation region, i.e. $\Phi*t1*m/e+\Phi*t2*n/e=\Phi*T*v/e*(1-a)$, i.e., $t1*m+0=T*v*(1-a)$. Because u=m and u=v, therefore $t1*v=T*v*(1-a)$, i.e., $t1=T*(1-a)$. Then $t2=a*T$, and $t1/t2=(1-a)/a$.

It can be seen that the values of t1 and t2 are not dependent on the full region image data and compensation image data, and are dependent on the optical loss coefficient. Therefore, after the optical loss coefficient is determined, the values of t1 and t2 can be directly calculated from the optical loss coefficient. Of course, in practice, the t1 and t2 values may be pre-stored in the storage unit along with the optical loss coefficient of the compensation region, and the signal processor can directly acquire the optical loss coefficient, t1 and t2 from the storage unit.

In practice, the image brightness in the non-compensation region of the display unit and in the compensation region are not necessarily the same, and it depends on the image actually being displayed on the display unit by the user. But because the compensation region of the display unit has optical loss, causing the image brightness in the compensation region and non-compensation region to be different, color patches may be noticeable in certain images.

However, from the above description, it can be seen that the target image brightness of the compensation region of the display unit can use the image brightness of the non-compensation region as a reference value, i.e. to make the target image brightness of the compensation region equal to the image brightness of the non-compensation region; of course a premise is that the brightness of the image data is the same for the compensation region and non-compensation region, therefore, as long as it is ensured that the predetermined ratio of the time period t1 and the time period t2, when modulation is based on the original image data and the compensation image data, respectively, is $(1-a)/a$, the non-uniformity of brightness of the display unit and the color patches can be prevented.

S15: Within a time period T when a frame of image is being modulated, within the time period t1, acquiring an original light and modulating the original light according to the full region image data, and within the time period t2, which is a time period within the time period T other than the time period t1, acquiring a compensation light and modulating the compensation light according to the compensation image data. The original light and the compensation light have the same flux.

Each image data is formed of red image data, green image data and blue image data, where the image data of each color is the grayscale value of the pixel of the image of that color. Therefore, in this embodiment, from the original image data of each color, the full region image data and compensation image data of that color can be obtained. Correspondingly, the original light and the compensation light each include red, green and blue lights. When the original light of a color is input to the modulator unit, the modulator unit modulates that color light according to the full region image data of that color, and when the compensation light of a color is input, the modulator unit modulates that color light according to the compensation image data of that color. From the above calculation, it can be seen that the same color light in the original light and compensation light have the same flux.

When modulating one frame of image data, the ratios of the time periods respectively used to modulate the red, green and blue lights are determined by the pre-set white balance of the image on the display unit. In this embodiment, all colors in the full region image data are compensated, so the compensation image data includes red compensation image data, green compensation image data and blue compensation image data, where the compensation image data for each color is the same as the full region image data of the corresponding color. To ensure that the white balance of the image is not changed by the brightness compensation in the compensation region, the ratios of the time periods respectively used to modulate the red, green and blue colors of the compensation image data are the same as the time ratios used to modulate these colors of the original image data.

In some practical situations, while compensating for brightness in the compensation region, it is also desirable to compensate for certain color in the compensation region. In such situations, the ratios of the time periods respectively used to modulate the red, green and blue colors of the compensation image data do not have to be the same as the time ratios used to modulate these colors of the original image data; rather, the time period for modulating a certain color may be extended or reduced based on need, so as to shift the color coordinates of the image in the compensation region.

It should be noted that the time period t1 for modulating the full region image data and the time period t2 for modulating the compensation image data do not have to be two periods one following another; they can be interleaved. For example, after modulating red image data of the full region image data, modulation of red image data of the compensation image data or other color image data may follow immediately, as long as with the time period T the corresponding color lights are modulated respectively using the full region image data and compensation image data of the corresponding color.

In this embodiment, by performing brightness compensation for the compensation region, the brightness of the compensation region can be consistent with the brightness of the non-compensation region, and can achieve brightness uniformity of the display unit without reducing the grayscale values of the non-compensation regions, thereby avoiding any reduction of the dynamic range of the displayed image.

Figure 2:
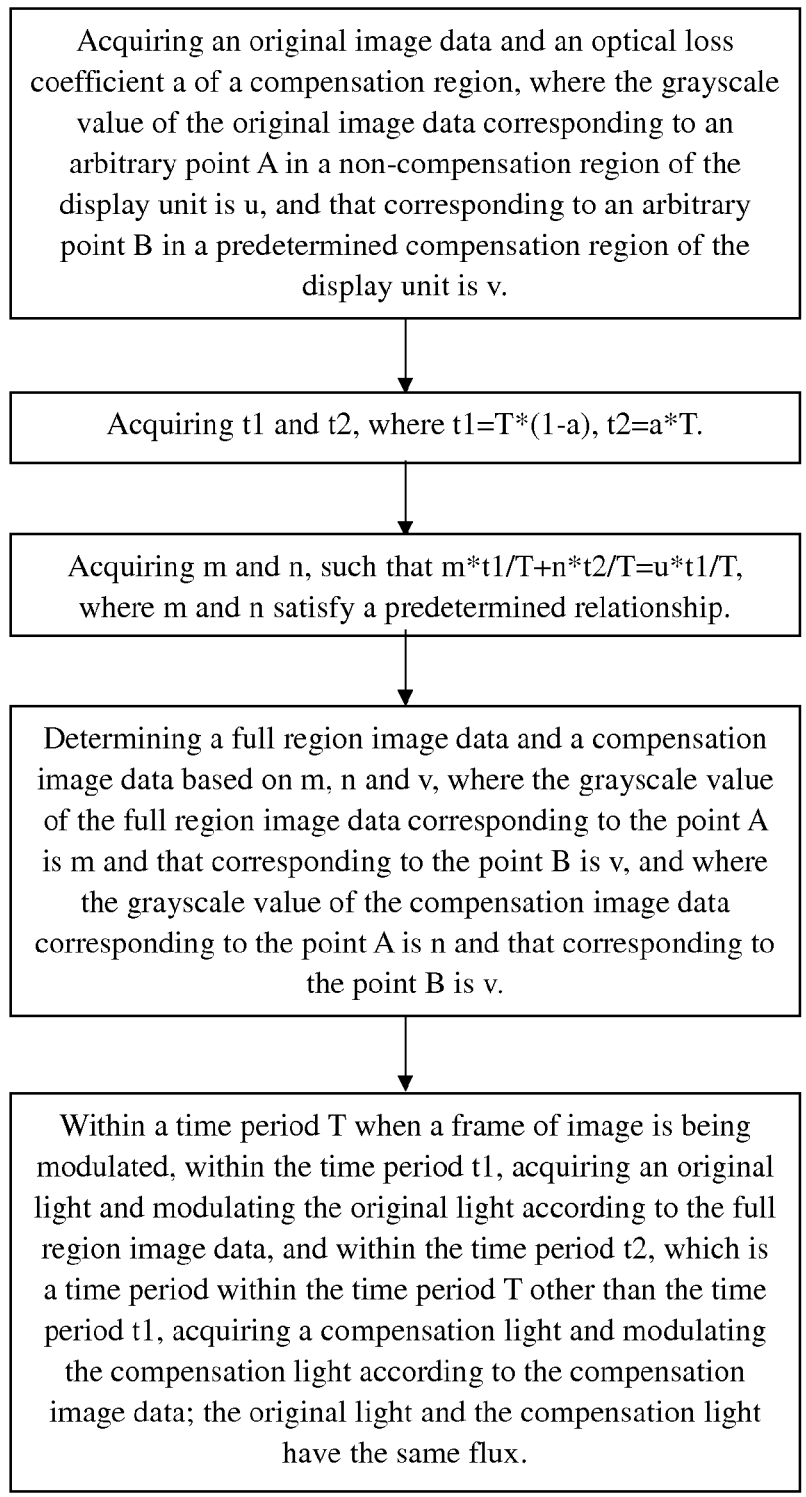
FIG. 2 is a flowchart of a display uniformity compensation method according to another embodiment of the present invention.

In the above description, the grayscale value n of the compensation image data at all points in the non-compensation region is pre-set to be zero. In practice, the grayscale values of the compensation image data in the non-compensation region do not have to be zero. In other words, the values of the original image data in the non-compensation region is divided into two values, respectively assigned to the non-compensation region of the full region image data and the non-compensation region of the compensation image data. Refer to FIG. 2, which is a flowchart of a display uniformity compensation method according to another embodiment of the present invention. As shown in FIG. 2, this embodiment includes the following method steps:

S21: Acquiring an original image data and an optical loss coefficient a of a compensation region, where the grayscale value of the original image data corresponding to an arbitrary point A in a non-compensation region of the display unit is u, and that corresponding to an arbitrary point B in a predetermined compensation region of the display unit is v.

The explanation of step S21 refers to the explanation of step S11.

S22: Acquiring t1 and t2, where $t1=T*(1-a)$, $t2=a*T$.

S23: Acquiring m and n, such that $m*t1/T+n*t2/T=u*t1/T$, where m and n satisfy a predetermined relationship.

S24: Determining a full region image data and a compensation image data based on m, n and v, where the grayscale value of the full region image data corresponding to the point A is m and that corresponding to the point B is v, and where the grayscale value of the compensation image data corresponding to the point A is n and that corresponding to the point B is q, where q=v.

In this embodiment, the sum of the brightness of the non-compensation region of the display unit formed by modulation in time period t1 using image data in the non-compensation region from the full region image data, which is $\Phi*t1*m/e$, and the brightness of the non-compensation region formed by modulation in time period t2 using image data in the non-compensation region from the compensation image data, which is $\Phi*t2*n/e$, should be equal to the brightness of the non-compensation region formed by modulation in time period t1 using image data in the non-compensation region from the original image data, which is $\Phi*t1*u/e$. In other words, $\Phi*t1*m/e+\Phi*t2*n/e=\Phi*t1*u/e$; or in other words, $t1*m+t2*n=t1*u$. This can ensure that the brightness in the non-compensation region and the compensation region of the display unit are consistent. It should be understood that when u, t1 and t2 are determined, m and n have an infinite number of solutions. Once a relationship between m and n, i.e. $n=m*x$ is determined, m and n can be determined.

In this embodiment, the value x can be pre-stored in the storage unit; the signal processor directly obtains the value x from the storage unit, and uses the above equation to calculate m and n. Of course, in practice, the value x may be input by the user in real time, and the signal processor obtains the user inputted value.

It should be understood that in practice, the value x does not have to represent the relationship between m and n; it can be used to represent the relationship between m and u, or between n and u. As long as at least two of m, n, and u satisfy a predetermined relationship, the values of m and n can be calculated. For convenience, in the following descriptions, the value x represent the relationship $n=m*x$.

In practice, the above calculations may be performed by other devices, to obtain the full region image data and the compensation image data, and the modulation device can acquire such image data from those devices.

S25: Within a time period T when a frame of image is being modulated, within the time period t1, acquiring an original light and modulating the original light according to the full region image data, and within the time period t2, which is a time period within the time period T other than the time period t1, acquiring a compensation light and modulating the compensation light according to the compensation image data. The original light and the compensation light have the same flux.

The explanation of step S25 refers to the explanation of step S15.

Figure 3:
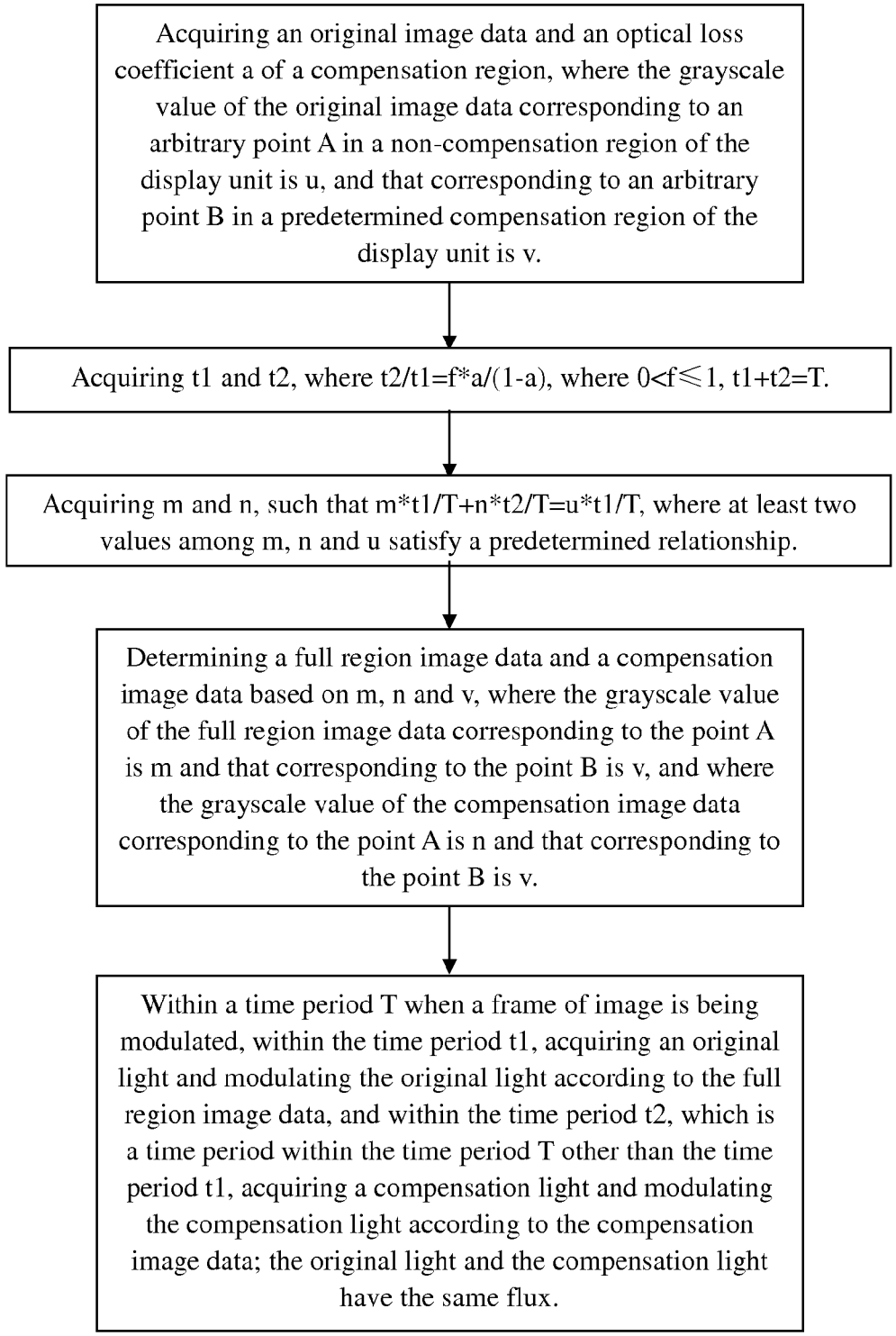
FIG. 3 is a flowchart of a display uniformity compensation method according to another embodiment of the present invention.

In practice, the predetermined ratio of time periods t1/t2 for respectively modulating the full region image data and the compensation image data does not have to be exactly equal to (1−a)/a; so long as $0<t1/t2\leq(1-a)/a$, the overall image brightness uniformity will be improved compared to conventional technology. Refer to FIG. 3, which is a flowchart of a display uniformity compensation method according to another embodiment of the present invention. As shown in FIG. 3, this embodiment includes the following method steps:

S31: Acquiring an original image data and an optical loss coefficient a of a compensation region, where the grayscale value of the original image data corresponding to an arbitrary point A in a non-compensation region of the display unit is u, and that corresponding to an arbitrary point B in a predetermined compensation region of the display unit is v.

The explanation of step S31 refers to the explanation of step S11.

S32: Acquiring t1 and t2, where $t2/t1=f*a/(1-a)$, where $0<f\leq1$, $t1+t2=T$.

S33: Acquiring m and n, such that $m*t1/T+n*t2/T=u*t1/T$, where at least two values among m, n and u satisfy a predetermined relationship.

S34: Determining a full region image data and a compensation image data based on m, n and v, where the grayscale value of the full region image data corresponding to the point A is m and that corresponding to the point B is v, and where the grayscale value of the compensation image data corresponding to the point A is n and that corresponding to the point B is q, where q=v.

In practice, the f and x values are pre-stored in the storage unit, where $0<f\leq1$; the signal processor obtains the f and x values from the storage unit, and calculate the values of t1 and t2 using $t2/t1=f*a/(1-a)$ and $t1+t2=T$; and obtain the m and n values using t1, t2 and x values.

When f is less than 1, after modulating a frame of image in time period T, the brightness of the compensation region of the display unit is still less than the brightness of the non-compensation region, but it is closer to the brightness of the non-compensation region than is the case in conventional technologies.

S35: Within a time period T when a frame of image is being modulated, within the time period t1, acquiring an original light and modulating the original light according to the full region image data, and within the time period t2, which is a time period within the time period T other than the time period t1, acquiring a compensation light and modulating the compensation light according to the compensation image data. The original light and the compensation light have the same flux.

The explanation of step S35 refers to the explanation of step S15.

In this embodiment, although the image brightness of the compensation region and non-compensation region of the display unit are uniform, the overall image brightness of the on the display unit is lower than when the entire time period T is used to modulate the original image data. Therefore, the flux of the original light and compensation light received by the modulation device can be both increased to increase the overall image brightness of the on the display unit.

Second Embodiment

In the first embodiment, the grayscale value q of the compensation image data for the point B is equal to the grayscale value v of the original image data for the point B, and the brightness uniformity of the compensation region and non-compensation region of the display unit is achieved by controlling the time periods t1 and t2 such that $t2/t1=a/(1-a)$. However, in practice, under the condition that the flux of the original light and compensation light are kept the same, the time periods can also be such that $0<t2/t1<a/(1-a)$, and a predetermined grayscale compensation value p is obtained; then, by adding to the grayscale value q at the point B in the compensation image data (the value in the first embodiment, q=v) the grayscale compensation value p, i.e. by letting q=v+p, to increase the image brightness of the compensation region, the brightness uniformity of the compensation region and non-compensation region may be achieved. Below are more detailed explanations.

Figure 4:
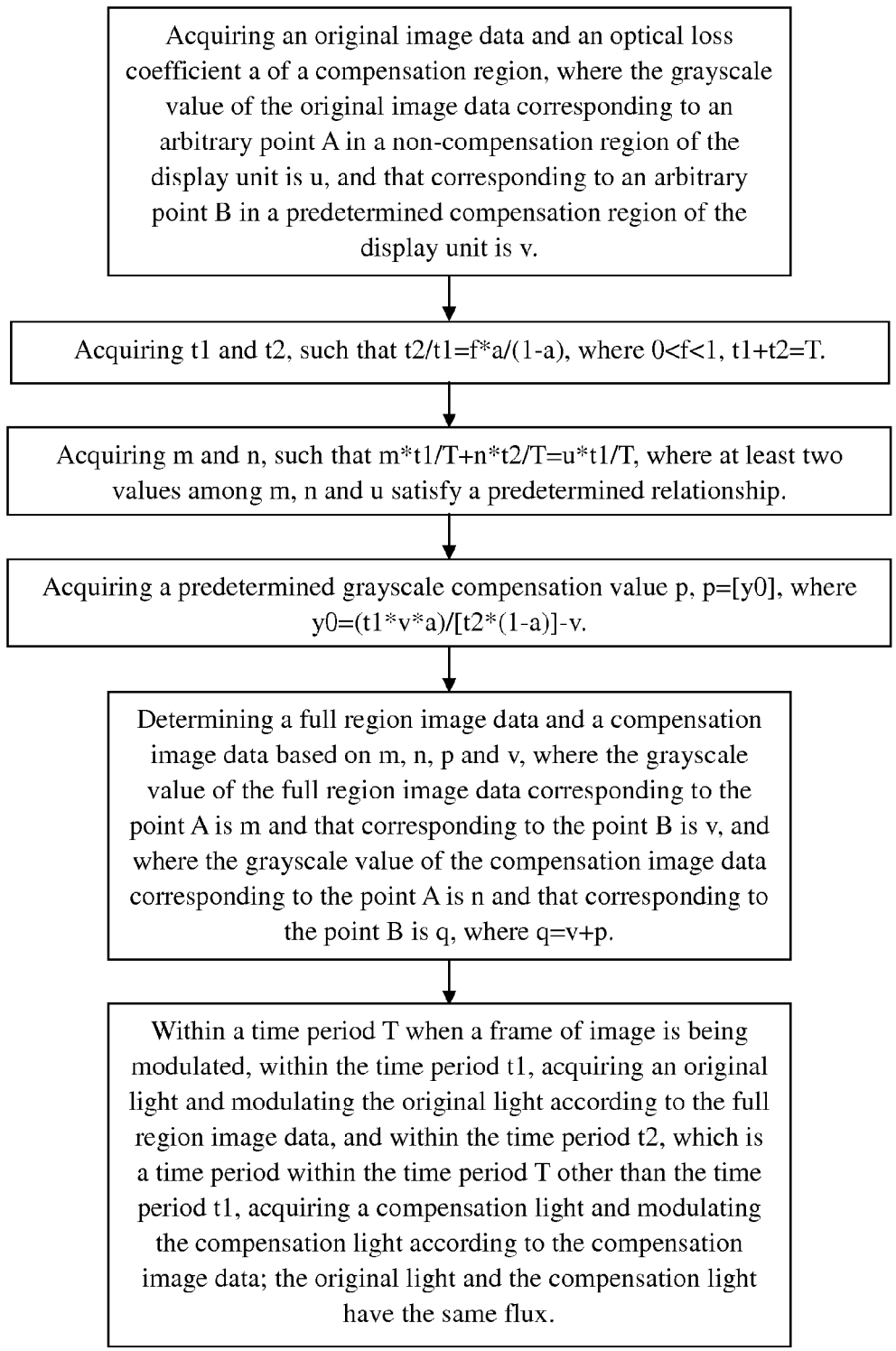
FIG. 4 is a flowchart of a display uniformity compensation method according to another embodiment of the present invention.

Refer to FIG. 4, which is a flowchart of a display uniformity compensation method according to another embodiment of the present invention. As shown in FIG. 4, different from the first embodiment, this embodiment includes the following method steps:

S41: Acquiring an original image data and an optical loss coefficient a of a compensation region, where the grayscale value of the original image data corresponding to an arbitrary point A in a non-compensation region of the display unit is u, and that corresponding to an arbitrary point B in a predetermined compensation region of the display unit is v.

The explanation of step S41 refers to the explanation of step S11.

S42: Acquiring t1 and t2, such that $t2/t1=f*a/(1-a)$, where $0<f\leq1$, $t1+t2=T$.

S43: Acquiring m and n, such that $m*t1/T+n*t2/T=u*t1/T$, where at least two values among m, n and u satisfy a predetermined relationship.

S44: Acquiring a predetermined grayscale compensation value p, $p=[y0]$, where $y0=(t1*v*a)/[t2*(1-a)]-v$.

S45: Determining a full region image data and a compensation image data based on m, n, p and v, where the grayscale value of the full region image data corresponding to the point A is m and that corresponding to the point B is v, and where the grayscale value of the compensation image data corresponding to the point A is n and that corresponding to the point B is q, where $q=v+p$.

When f is less than 1, after modulating a frame of image in time period T, the brightness of the compensation region of the display unit is still lower than the brightness of the non-compensation region. Thus, by adding y0 to the grayscale value of each pixel in the compensation region of the compensation image data, the brightness of the compensation region is closer to the brightness of the non-compensation region.

When t1 and t2 are determined, in the time period t1 when the full region image data is used for modulation, the actual brightness in the compensation region is $\Phi*t1*v/e*(1-a)$. In the time period t2 when the compensation image data is used for modulation, the actual brightness in the compensation region is $\Phi*t2*(v+y0)/e*(1-a)$. From the description of the first embodiment, it can be seen that when the brightness of pixels of the display unit is uniform, the brightness of the compensation region should be $\Phi*t1*v/e$. Therefore, $\Phi*t1*v/e*(1-a)+\Phi*t2*(v+y0)/e*(1-a)=\Phi*t1*v/e$, in other words, $t1*v*(1-a)+t2*(v+y0)*(1-a)=t1*v$. Thus, when t1, t2, v and a are determined, $y0=(t1*v*a)/[t2*(1-a)]-v=(a*T-t2)*v/[t2*(1-a)]$. In practice, the y0 value may not be an integer, so the integer part of y0 may be taken, and denoted [y0]. Thus, in this embodiment, the predetermined grayscale compensation value is $p=[y0]$.

S46: Within a time period T when a frame of image is being modulated, within the time period t1, acquiring an original light and modulating the original light according to the full region image data, and within the time period t2, which is a time period within the time period T other than the time period t1, acquiring a compensation light and modulating the compensation light according to the compensation image data. The original light and the compensation light have the same flux.

The explanation of step S46 refers to the explanation of step S15.

Compared to the first embodiment, this embodiment can increase the overall image brightness of the display unit.

Of course, in practice, the predetermined grayscale compensation value p does not have to be [y0]; it can be y, where $0<y\leq[y0]$, and y is an integer. This can increase the overall image brightness and uniformity as compared to conventional technology. This way, an algorithm may be pre-stored in the storage unit. For example, after calculating y0, the signal processor can obtain any integer value between 0 and [y0], and use it as the grayscale compensation value p.

Third Embodiment

In the second embodiment, when f is less than 1, and the flux of the original light and compensation light are kept the same, by adding a predetermined grayscale compensation value to the grayscale value of each pixel in the compensation region of the compensation image data, the brightness of the compensation region and non-compensation region of the display unit are made uniform.

In this embodiment, on the other hand, when f is less than 1, during the time period when the modulating device modulates the compensation image data, the predetermined grayscale compensation value for each pixel in the compensation region is set to 0; but by increasing the drive current for the compensation light source of the light source system, i.e. by making the flux of the compensation light received by the modulating device greater than the flux of the original light, the image brightness is increased in the compensation region of the display unit during the time period of modulating the compensation image data. The ratio (denoted d) of the flux of the compensation light to the flux of the original light depends on the value of t2/t1, such that the image brightness in the compensation region of the display unit and the non-compensation region are uniform.

Refer to FIG. 5, which is a flowchart of a display uniformity compensation method according to another embodiment of the present invention. As shown in FIG. 5, different from the first embodiment, this embodiment includes the following method steps:

S51: Acquiring an original image data and an optical loss coefficient a of a compensation region, where the grayscale value of the original image data corresponding to an arbitrary point A in a non-compensation region of the display unit is u, and that corresponding to an arbitrary point B in a predetermined compensation region of the display unit is v.

The explanation of step S51 refers to the explanation of step S11.

S52: Acquiring t1 and t2, such that $t2/t1=f*a/(1-a)$, where $0<f\leq1$, $t1+t2=T$.

S53: Acquiring m and n, such that $m*t1/T+n*t2/T=u*t1/T$, where $n=m*x$, $x=0$.

S54: Determining a full region image data and a compensation image data based on m, n, and v, where the grayscale value of the full region image data corresponding to the point A is m and that corresponding to the point B is v, and where the grayscale value of the compensation image data corresponding to the point A is n and that corresponding to the point B is q, where $q=v$.

S55: Within a time period T when a frame of image is being modulated, within the time period t1, acquiring an original light and modulating the original light according to the full region image data, and within the time period t2, which is a time period within the time period T other than the time period t1, acquiring a compensation light and modulating the compensation light according to the compensation image data. The flux of the compensation light is d times the flux of the original light, $d=(t1*a)/[t2*(1-a)]$.

Let $\Phi$ be the flux of the original light, then the flux of the compensation light is $\Phi*d$, where d is greater than 1. When t1 and t2 are determined, in the time period t1 when the full region image data is modulated, the actual brightness in the compensation region is $\Phi*t1*v/e*(1-a)$. In the time period t2 when the compensation image data is modulated, the actual brightness in the compensation region is $\Phi*d*t2*v/$ $e*(1-a)$. From the description of the first embodiment, it can be seen that when the brightness of all pixels of the display unit is the same, the brightness of the compensation region should be $\Phi*t1*v/e$; therefore, $\Phi*t1*v/e*(1-a)+\Phi*d*t2*v/e*(1-a)=\Phi*t1*v/e$, in other words, $t1*(1-a)+d*t2*(1-a)=t1$. Thus, $d=(t1*a)/[t2*(1-a)]$.

In the second embodiment, sometimes it is possible that the grayscale values of certain pixels in the compensation region are already at the maximum and cannot be further increased, causing the image brightness of these points to be inconsistent with the image brightness of the non-compensation region, so that the image is not uniform in certain areas. In this embodiment, on the other hand, by increasing the drive current of the light source, the uniformity of the image brightness is improved and the above-mentioned problem is prevented.

Fourth Embodiment

Of course, in practice, the two methods described in the second embodiment and third embodiment can be combined.

Figure 6:
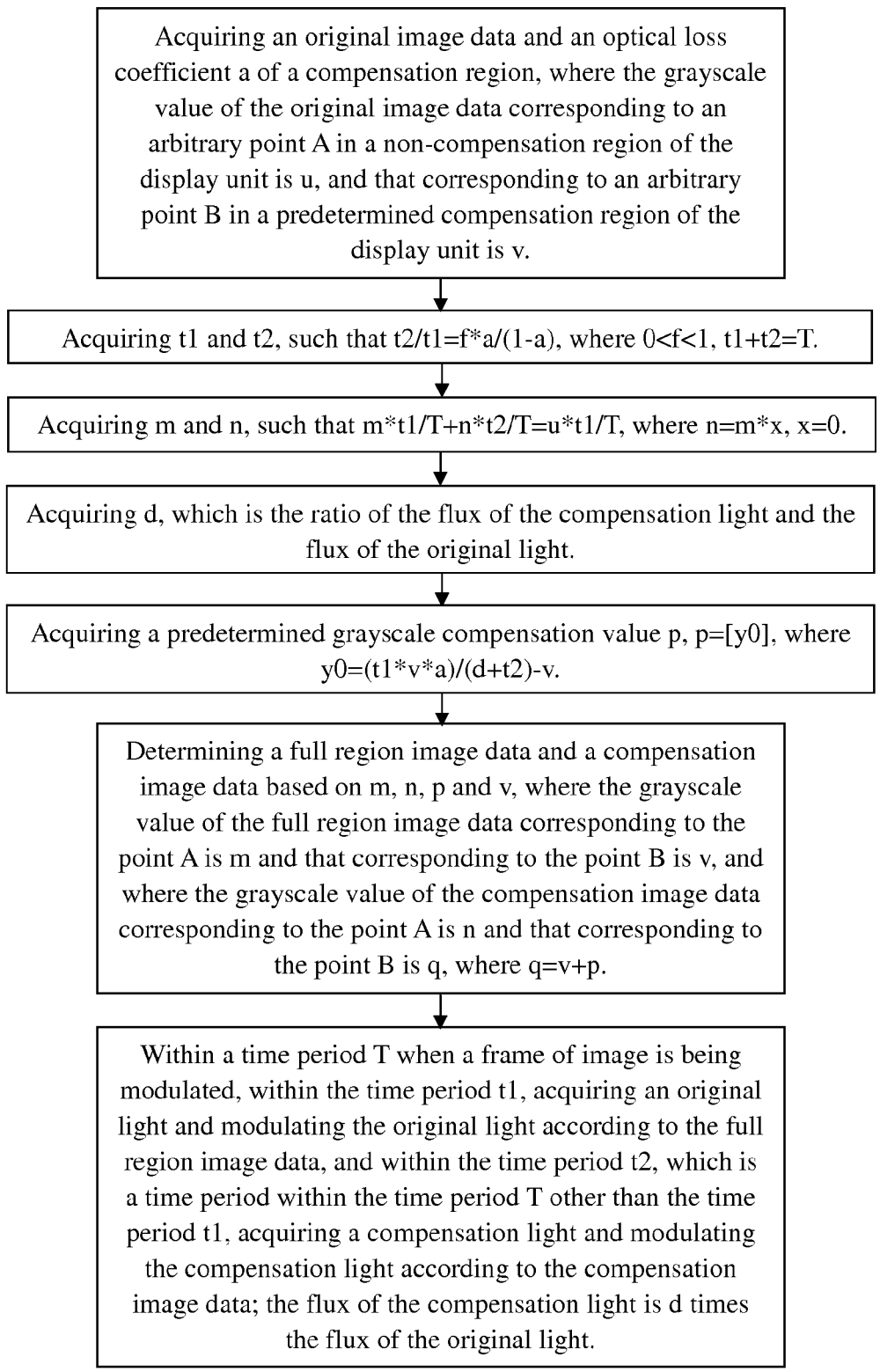
FIG. 6 is a flowchart of a display uniformity compensation method according to another embodiment of the present invention.

Refer to FIG. 6, which is a flowchart of a display uniformity compensation method according to another embodiment of the present invention. As shown in FIG. 6, different from the first embodiment, this embodiment includes the following method steps:

S61: Acquiring an original image data and an optical loss coefficient a of a compensation region, where the grayscale value of the original image data corresponding to an arbitrary point A in a non-compensation region of the display unit is u, and that corresponding to an arbitrary point B in a predetermined compensation region of the display unit is v.

The explanation of step S61 refers to the explanation of step S11.

S62: Acquiring t1 and t2, such that $t2/t1=f*a/(1-a)$, where $0<f\leq1$, $t1+t2=T$.

S63: Acquiring m and n, such that $m*t1/T+n*t2/T=u*t1/T$, where $n=m*x$, $x=0$.

S63A: Acquiring d, which is the ratio of the flux of the compensation light and the flux of the original light.

S64: Acquiring a predetermined grayscale compensation value p, $p=[y0]$, where $y0=(t1*v*a)/(d+t2)-v$.

S65: Determining a full region image data and a compensation image data based on m, n, p and v, where the grayscale value of the full region image data corresponding to the point A is m and that corresponding to the point B is v, and where the grayscale value of the compensation image data corresponding to the point A is n and that corresponding to the point B is q, where $q=v+p$.

S66: Within a time period T when a frame of image is being modulated, within the time period t1, acquiring an original light and modulating the original light according to the full region image data, and within the time period t2, which is a time period within the time period T other than the time period t1, acquiring a compensation light and modulating the compensation light according to the compensation image data. The flux of the compensation light is d times the flux of the original light.

Let $\Phi$ be the flux of the original light, then the flux of the compensation light is $\Phi*d$, where d is greater than 1. When t1 and t2 are determined, in the time period t1 when the full region image data is modulated, the actual brightness in the compensation region is $\Phi*t1*v/e*(1-a)$. In the time period t2 when the compensation image data is modulated, the actual brightness in the compensation region is $\Phi*d*t2*(v+y0)/e*(1-a)$. From the description of the first embodiment, it can be seen that when the brightness of pixels of the display unit is uniform, the brightness of the compensation region should be $\Phi*t1*v/e$; therefore, $\Phi*t1*v/e*(1-a)+\Phi*d*t2*(v+y0)/e*(1-a)=\Phi*t1*v/e$, in other words, $t1*v*(1-a)+d*t2*(v+y0)=t1*v$. Thus, when t1, t2, v and a are determined, y0 and d have an infinite number of solutions. Once d is determined, y0 can be determined as well, $y0=(t1*v*a)/(d+t2)-v$. In practice, the y0 value may not be an integer, so the integer part of y0 may be taken, and denoted [y0]. Thus, the predetermined grayscale compensation value is $p=[y0]$.

Compared to the first embodiment, because the time for modulating the original image data by the modulating device is longer, the overall image brightness of the display unit can be improved.

Of course, in practice, the predetermined grayscale compensation value p does not have to be [y0]; it can be y, where $0<y[y0]$, and y is an integer. This can increase the overall image brightness and uniformity as compared to conventional technology. This way, an algorithm may be pre-stored in the storage unit. For example, after calculating y0, the signal processor can obtain any integer value between 0 and [y0], and use it as the grayscale compensation value p.

Fifth Embodiment

In the second embodiment, in the time period when the modulating device is modulating the compensation image data, the flux of the original light and compensation light are kept the same, any by adding a predetermined grayscale compensation value to the grayscale value of each pixel in the compensation region, the brightness of the compensation region is increased.

However, in practice, because the actual optical loss coefficient of each pixel in the compensation region is not necessarily the same, the predetermined grayscale compensation value for different pixels in the compensation region may be different, so as to specifically enhance the brightness of different pixels in the compensation region by different amounts. This is unlike the other methods in which the brightness of all pixels in the compensation region is increased by the same amount at the same time, and it is more flexible and the compensation is more accurate, so that the image brightness of the display unit is more uniform. This method is explained below. Refer to FIG. 7, which is a flowchart of a display uniformity compensation method according to another embodiment of the present invention. As shown in FIG. 7, different from the first embodiment, this embodiment includes the following method steps:

S71: Acquiring an original image data and an optical loss coefficient matrix of a compensation region; the optical loss coefficient value of a pixel B1 of the optical loss coefficient matrix is denoted the optical loss coefficient a of the compensation region. The grayscale value of the original image data corresponding to an arbitrary point A in a non-compensation region of the display unit is u, that corresponding to the pixel B1 in the predetermined compensation region of the display unit is v1, and that corresponding to another arbitrary pixel B2 in the predetermined compensation region of the display unit is v2. The optical loss coefficient of the optical loss coefficient matrix corresponding to the pixel B1 is a1, and that corresponding to the pixel B2 is a2.

In the first embodiment, when determining the optical loss coefficient a, the average value of the optical loss coefficients in the optical loss coefficient matrix is used. In this embodiment, the actual optical loss coefficient of each pixel of the compensation region is measured, to generate an optical loss coefficient matrix; meanwhile, the optical loss coefficient of the pixel B1 in the optical loss coefficient matrix is used as the optical loss coefficient a of the compensation region, i.e., a=a1.

In a specific example, in this embodiment, the optical loss coefficient a1 of the pixel B1 is the minimal one of the optical loss coefficient matrix, i.e., a1<a2.

S72: Acquiring t1 and t2, where t1=T*(1−a), t2=a*T.

S73: Acquiring m and n, such that m*t1/T+n*t2/T=u*t1/T, where at least two of m, n and u satisfy a predetermined relationship.

S74: Acquiring predetermined grayscale compensation values p, where the grayscale compensation value for the compensation image data corresponding to the pixel B1 is p1=0, and that corresponding to the pixel B2 is p2=[y0], where y0=[t1*v2−T*v2*(1−a)]/t2.

S75: Determining a full region image data and a compensation image data based on m, n, p1, p2 and v, where the grayscale value of the full region image data corresponding to the point A is m and that corresponding to the point B is v, and where the grayscale value of the compensation image data corresponding to the point A is n, that corresponding to the pixel B1 is v, and that corresponding to the pixel B2 is v+p2.

In this embodiment, the compensation image data obtained using the method of the first embodiment is used as an initial compensation image data (where the grayscale value corresponding to the point A is n, that corresponding to the pixel B1 is v1, and that corresponding to the pixel B2 is v2); then, based on the optical loss coefficient matrix (a1 and a2), the optical loss coefficient a of the compensation region, and the initial compensation image data, the grayscale compensation value p for each pixel in the compensation region of the compensation image data is calculated, and the initial compensation image data and the grayscale compensation value are combined to form the compensation image data. This is explained in detail below.

In this embodiment, when it is determined that the ratio of the time periods respectively used by the modulating device to modulate the full region image data and to modulate the compensation image data is the predetermined ratio a/(1−a), the minimum value in the compensation image data matrix is a, i.e., the brightness compensation value for each pixel of the compensation region, as calculated using the method of the first embodiment, is the optical loss amount of the pixel B1 of the compensation region that has the lowest loss.

In this embodiment, because the optical loss coefficient of the pixel B1 is less than the optical loss coefficient of the pixel B2, after obtaining the initial compensation image data using the method of the first embodiment (where the grayscale value of the pixel B1 in the compensation image data is v1, and that of the pixel B2 is v2), the initial brightness of the pixel B1 is equal to the predetermined brightness of the pixel B1, so the predetermined grayscale compensation value for the pixel B1 is 0; however the initial brightness of the pixel B2 is less than the predetermined brightness of the pixel B2, so the predetermined grayscale compensation value for the pixel B2 is greater than 0. Here the initial brightness refers to the image brightness obtained when the full region image data and the initial compensation image data are respectively modulated within the time period T; the predetermined brightness refers to the desired image brightness that should be obtained when the full region image data and the initial compensation image data are respectively modulated within the time period T in order to achieve a uniform image brightness.

The difference between the initial brightness of the pixel B2 and the predetermined brightness of the pixel B2 is calculated, and the difference value is converted to the required addition of the grayscale value to the initial compensation image data at the pixel B2, i.e., the predetermined grayscale compensation value y0 of the pixel B2.

More specifically, the initial brightness of the pixel B2 is $\Phi*t1*v2/e*(1-a2)+\Phi*t2*v2/e*(1-a2)=\Phi*T*v2/e*(1-a1)$, while the predetermined brightness of the pixel B2 is $\Phi*t1*v2/e$, so the difference between these two is $\Delta E = \Phi*t1*v2/e - \Phi*T*v2/e*(1-a2)$. Because $\Phi*t2*y0/e = \Delta E$, therefore $y0 = [t1*v2 - T*v2*(1-a2)]/t2$. In practice, the y0 value may not be an integer, so the integer part of y0 may be taken, and denoted [y0]. Thus, in this embodiment, the predetermined grayscale compensation value for the pixel B2 is p2=[y0].

This way, a corresponding compensation value is added to the grayscale value of each pixel in the initial compensation image data, to obtain the final compensation image data, where the grayscale value of the pixel B2 in the final compensation image data is v2+p2, and that of the pixel B1 is v1.

S76: Within a time period T when a frame of image is being modulated, within the time period t1, acquiring an original light and modulating the original light according to the full region image data, and within the time period t2, which is a time period within the time period T other than the time period t1, acquiring a compensation light and modulating the compensation light according to the compensation image data. The original light and the compensation light have the same flux.

The explanation of step S76 refers to the explanation of step S15.

Of course, in this embodiment, the optical loss coefficient a used in the predetermined ratio (1−a)/a does not have to be the minimum value in the optical loss coefficient matrix; it can be other values, such as a median value. This way, for pixels B2 other than pixel B1, of the initial brightness obtained from brightness compensation calculated using the method of the first embodiment, for some pixels it will be less than the predetermined brightness, and for some others it will be greater than the predetermined brightness. Thus, for those pixels whose initial brightness is greater than the predetermined brightness, the predetermined grayscale compensation value p will be negative, and for those pixels whose initial brightness is less than the predetermined brightness, the predetermined grayscale compensation value p will be positive. By using the median value of the optical loss coefficient matrix, rather than the minimum value, as the optical loss coefficient, it can prevent the problem caused by certain grayscale values being already at the maximum and not being able to be further increased.

In this embodiment, if the grayscale values n of some pixels B2 in the initial compensation image data are already the maximum value, then the grayscale values in the compensation image data cannot be increased from the grayscale values in the initial compensation image data, so p cannot be added. Thus, the flux of both the original light and compensation light can be increased appropriately by the same amount, and correspondingly, the grayscale values of all pixels in the full region image data and the initial compensation image data will decrease correspondingly, where the degree of decrease of the grayscale values is dependent on the amount of increase of the drive currents of the light sources, in order to ensure that the initial brightness of the pixels B2 remains the same. This can prevent the problem that the grayscale values of some pixels B2 cannot be increased, and in turn prevent the problem that the final brightness of the pixels B2 is lower than the predetermined brightness.

Sixth Embodiment

Figure 8:
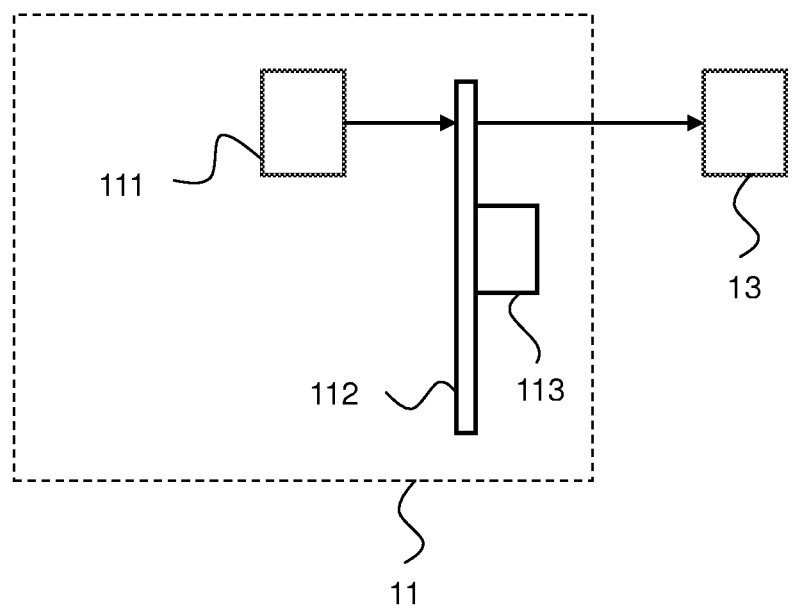
FIG. 8 schematically illustrates the structure of a projection system according to an embodiment of the present invention.

Refer to FIG. 8, which schematically illustrates the structure of a projection system according to an embodiment of the present invention. The projection system includes a light source system 11, an optical modulation device 13 and a projection lens (not shown in the drawings).

The light source system 11 includes an excitation light source 111, a wavelength conversion device 112 and a drive device 113. The excitation light source 111 generates an excitation light. In practice, the excitation light source 111 may use light emitting diodes (LED), laser diodes (LD), or other solid state light emitting devices. In this embodiment, the excitation light source 111 is an ultraviolet light source.

Figure 9:
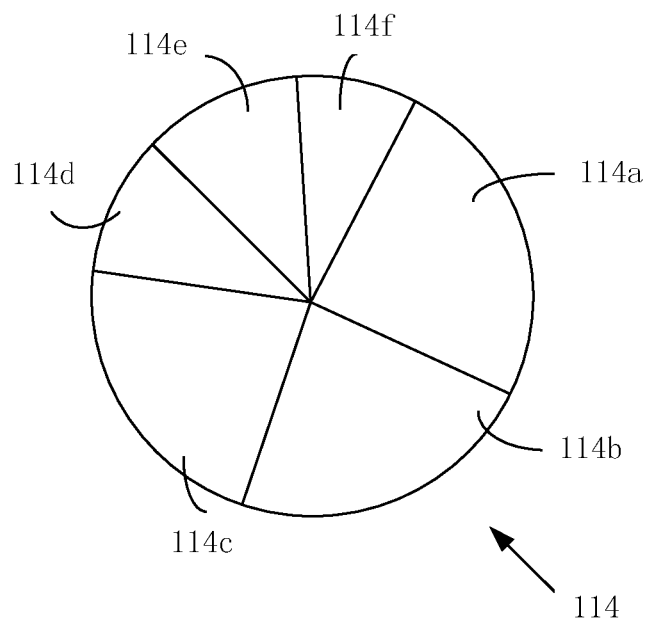
FIG. 9 is a schematic plan view of the wavelength conversion device of the projection system of FIG. 8.

Refer to FIG. 9, which is a schematic plan view of the wavelength conversion device of the projection system of FIG. 8. The wavelength conversion device 112 includes a wavelength conversion layer 114 and a substrate for carrying the wavelength conversion layer 114 (not shown in the drawings). The substrate is a round plate shape, and the wavelength conversion layer 114 is a ring shape concentric with the round plate. The wavelength conversion layer 114 contains wavelength conversion materials, for absorbing the excitation light from the excitation light source 111 and converting it to converted lights. Some commonly used wavelength conversion materials are phosphor materials, such YAG phosphor materials, which can absorb blue light and is excited to generate yellow converted light. The wavelength conversion materials may also be quantum dots, fluorescent dyes or other materials having wavelength conversion properties, and are not limited to phosphors. In this embodiment, the wavelength conversion device 112 is a transmission type device, i.e., the light incident direction and light output direction of the wavelength conversion device 112 are in the same direction, where the substrate transmits the excitation light.

The wavelength conversion layer 114 includes an original light region and a compensation light region, where the original light region of the wavelength conversion layer 114 and the excitation light source 111 together constitute the original light source, for outputting the original light; the compensation light region of the wavelength conversion layer 114 and the excitation light source 111 together constitute the compensation light source, for outputting the compensation light. In this embodiment, the original light region and the compensation light region are arranged side by side; the original light region and the compensation light region each includes first, second and third segments, where the first, second and third segments respectively contain first, second and third wavelength conversion materials, for absorbing the excitation light form the excitation light source 111 and respectively outputting the first, second and third converted lights. More specifically, the first segment of the original light region 114a and the first segment of the compensation light region 114d both carry a red wavelength conversion material, the second segment of the original light region 114b and the second segment of the compensation light region 114e both carry a green wavelength conversion material, and the third segment of the original light region 114c and the third segment of the compensation light region 114f both carry a blue wavelength conversion material.

The drive device 113 drives the wavelength conversion device 112 to rotate, such that the different segments of the wavelength conversion layer 114 of the wavelength conversion device 112 are sequentially disposed on the light path of the excitation light, and whereby the original light and the compensation light are output sequentially from the same optical path. In this embodiment, the drive device 13 drives the wavelength conversion device 112 to rotate around its center, such that the light spot of the excitation light formed on the wavelength conversion layer 114 sequentially acts on the different segments of the wavelength conversion layer 114 along a circular path, to sequentially generate the different colored lights.

Figure 10:
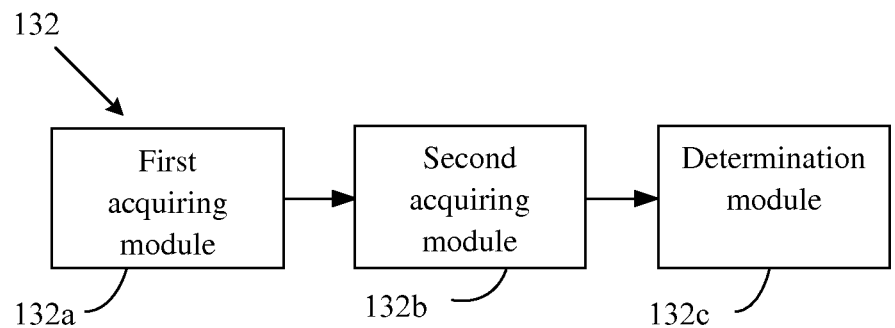
FIG. 10 is a schematic block diagram of the signal processor of the projection system of FIG. 8.

The lithe modulation device 13 includes an optical modulator unit and a signal processor 132. Refer to FIG. 10, which is a schematic block diagram of the signal processor of the projection system of FIG. 8. Specifically, the signal processor 132 includes a first acquiring module 132a, a second acquiring module 132b, and a determination module 132a. The first acquiring module 132a is sued to acquire the original image and the optical loss coefficient a of the compensation region, where the grayscale value of the original image data corresponding to an arbitrary point A in a non-compensation region of the display unit is u, and that corresponding to an arbitrary point B in a predetermined compensation region of the display unit is v; and to acquire t1 and t2, such that $t2/t1=f*a/(1-a)$, where $0<f\leq1$, and $t1+t2=T$. The second acquiring module 132b is used to acquire m and n, such that $m*t1/T+n*t2/T=u*t1/T$, where at least two values among m, n and u satisfy a predetermined relationship. The determination module 132c is used to determine the full region image data and the compensation image data based on m, n and v, where the grayscale value of the full region image data corresponding to the point A is m and that corresponding to the point B is v, and where the grayscale value of the compensation image data corresponding to the point A is n and that corresponding to the point B is q, where $q\geq v$, and where q and v satisfy a predetermined relationship.

Figure 11:
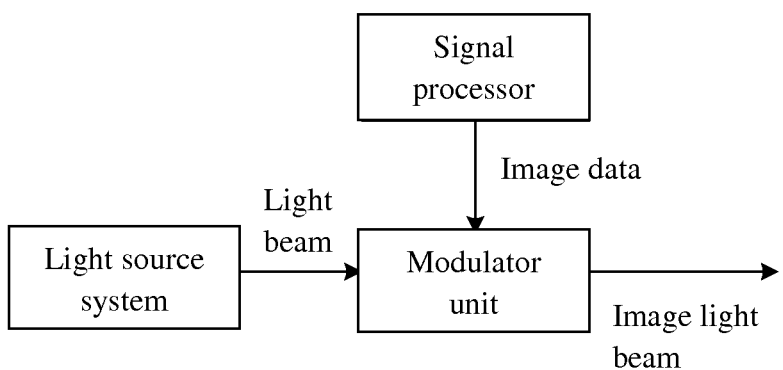
FIG. 11 is a schematic block diagram illustrating the relationship of the signal processor, the optical modulating unit and the light source system in the projection system of FIG. 8.

Refer to FIG. 11, which is a schematic block diagram illustrating the relationship of the signal processor, the optical modulating unit and the light source system in the projection system of FIG. 8. The optical modulator unit is used to acquire the original light from the original light source of the light source system 11 and the compensation light from the compensation light source; the optical modulator unit further acquires the image data from the signal processor 132, where each frame of the image data is formed by the full region image data and the compensation image data. Within a time period T when a frame of image is being modulated, within the time period t1, the modulator unit acquires the original light and modulates the original light according to the full region image data, and within a time period t2, which is a time period within the time period T other than the time period t1, acquires the compensation light and modulates the compensation light according to the compensation image data. The image light after modulation by the modulator unit is output to the projection lens and projected by the projection lens to a predetermined plane.

In this embodiment, because the positions of the various segments of the wavelength conversion device are fixed, when setting the projection system, the sequence that the optical modulator unit uses to acquire the image data from the signal processor within the time period T also need to be pre-set, so that the two sequences match each other. This way, when one of the light source system and the optical modulation device sends an initialization signal to the other, the light source system and the optical modulation device can start operating at the same time, so that the image data and light received by the optical modulation device match each other.

Specifically, in this embodiment, within the time period T, the wavelength conversion device 112 rotates two revolutions. During the first revolution of the wavelength conversion device 112, the wavelength conversion device 112 sequentially outputs the red, green and blue original light, and then the red, green and blue compensation light. Thus, correspondingly, the optical modulation device sequentially receives the red, green and blue image data of the full region image data, and then the red, green and blue image data of the compensation image data. During the second revolution of the wavelength conversion device 112, the above process is repeated. The control device controls the light source system and the optical modulation device to start operating at the same time, so that the optical modulation device accomplishes modulation of one frame of image.

In the projection system, the wavelength conversion device 112 is required to have a certain rotation speed; typically, the time for two revolutions of the wavelength conversion device 112 is the time for modulating one frame of image data. From the first embodiment, it can be seen that the in the time period T for modulating a frame of image data by the modulator unit, the time period t1 for modulating the original image data and the time prior t2 for modulating the compensation image data are fixed (e.g., they are respectively $(1-a)*T$ and $a*T$, where a is the optical loss coefficient in the compensation region of the display screen). Thus, in the wavelength conversion layer, the ratio of the angular sizes of the original light region and compensation light region is also fixed, so that the time periods that the excitation light passes the original light region and compensation light region of the wavelength conversion layer are respectively t1 and t2.

In this embodiment, the light source system uses an excitation light to excite the wavelength conversion layer to generate the light to be modulated, which can provide high brightness light for the modulating device.

Preferable, in this embodiment, in the first acquiring module 132a of the signal processor, $t2/t1=a/(1-a)$, and in the determination module 132c, $q=v$. Meanwhile, the original light and the compensation light have the same flux, to simplify the data processing load of the signal processor.

Preferably, in this embodiment, in the first acquiring module 132a of the signal processor, $t2/t1=a/(1-a)$, and the second acquiring module 132b is further used to acquire the predetermined grayscale compensation value p, where $0<p\leq[y0]$, $y0=(t1*v*a)[t2*(1-a)]-v$; and in the determination module 132c, $q=v+p$. Meanwhile, the original light and the compensation light have the same flux.

Preferably, in this embodiment, in the first acquiring module 132a of the signal processor, $t2/t1=a/(1-a)$, and in the determination module 132c, $n=0$, $m=u$, $q=v$. Meanwhile, the flux of the compensation light is d times that of the original light, where $d=(t1*a)/[t2*(1-a)]$.

Preferably, in this embodiment, in the first acquiring module 132a of the signal processor, $t2/t1=a/(1-a)$, and the second acquiring module 132b is further used to acquire the predetermined grayscale compensation value p, where $0<p\leq[y0]$, $y0=(t1*v*a)/(d+t2)-v$; and in the determination module 132c, $n=0$, $m=u$, $q=v+p$. Meanwhile, the flux of the compensation light is d times that of the original light.

Preferably, the original light and the compensation light have the same flux, and in the first acquiring module 132a of the signal processor, acquiring the optical loss coefficient a of the compensation region includes: acquiring an optical loss coefficient matrix of the compensation region, and taking the optical loss coefficient of a pixel B1 in the optical loss coefficient matrix as the optical loss coefficient a; where the grayscale value of the original image data corresponding to the pixel B1 of the predetermined compensation region of the display unit is v1, and that corresponding to an arbitrary other pixel B2 of the predetermined compensation region is v2; the optical loss coefficient of the optical loss coefficient matrix corresponding to the pixel B1 is a1, and that corresponding to the pixel B2 is a2; and $t2/t1=a/(1-a)$. The second acquiring module 132b is further used to acquire the predetermined grayscale compensation value p, where the grayscale compensation value p of the compensation image data corresponding to the pixel B1 is $p=0$, and that corresponding to the pixel B2 is $p=[y0]$, where $y0=[t1*v2-T*v2*(1-a2)]/t2$; in the determination module 132c, $q=v+p$. Here, the optical loss coefficient of the pixel B1 is preferably a median value of the optical loss coefficient matrix.

Preferably, in the above embodiment, in the determination module 132c of the signal processor, $n=0$, $m=u$.

In this embodiment, the original light region and the compensation light region on the wavelength conversion layer do not have to be next to each other; rather, the arrangement sequence of various segments of the two regions can be any sequence. Preferably, the same colored segments of the original light region and compensation light region are adjacent to each other, to reduce the number of spokes on the wavelength conversion layer that separate adjacent segments of different colors.

Similarly, because some regions are taken from the wavelength conversion layer 114 to be the compensation light region for the purpose of image brightness compensation of the compensation region of the display unit, the overall image brightness of the display unit is lower. One solution to this problem is to keep the rotation speed of the wavelength conversion layer unchanged, but to increase the radius of the wavelength conversion layer 114 and the drive current of the excitation light source 111, so as to increase the amount of wavelength conversion materials being excited by the excitation light in a unit time, thereby increasing the amount of the converted light generated by the wavelength conversion layer 114. Of course, in the situation where the wavelength conversion materials in the wavelength conversion layer is not saturated, it is also acceptable to only increase the drive current of the excitation light source 111 without increasing the radius of the wavelength conversion layer 114. In the situation where the wavelength conversion layer 114 cannot completely absorb the excitation light, it is acceptable to only increase the radius of the wavelength conversion layer 114 without increasing the drive current of the excitation light source 111. Another solution to the problem is to increase the rotation speed of the wavelength conversion layer and to increase the drive current of the excitation light source 111, and at the same time to increase the processing speed of the optical modulation device 13, so that the optical modulation device can receive more light during the time period T for processing a frame of image.

In this embodiment, the excitation light source 111 may alternatively be a blue light source. Correspondingly, the third segments of both the original light region and the compensation light region of the wavelength conversion layer 114 of the wavelength conversion device 112 carry no wavelength conversion materials, but are light transmission regions. When the excitation light source 11 is a laser light source, the light transmission regions preferably carry a scattering material or have a scattering structure, to scatter the excitation light.

In this embodiment, the wavelength conversion device 112 may alternatively be a reflective type device, i.e., the light incident direction and light output direction of the wavelength conversion device 112 are in the opposite directions, where the propagation paths of both light beams are on the same side of the wavelength conversion device 112. Correspondingly, the substrate of the wavelength conversion device 112 is a reflective substrate, and the excitation light is incident on the side of the wavelength conversion layer 114 that faces away from the substrate.

In this embodiment, the first, second and third segments of the compensation light region of the wavelength conversion layer 114 do not have to carry the red, green and blue wavelength conversion materials; rather, they may alternatively all carry a yellow wavelength conversion material, for generating a yellow light or a mixed light of the yellow light and unabsorbed blue light, to increase the brightness of the compensation region of the display unit. Or, the compensation light region may include only one segment that carries a green wavelength conversion material. Of all the colors, because human eyes are the most sensitive to green light, compensating for only the green color can also improve uniformity of the image brightness of display unit as perceived by the human eyes. Of course, the compensation light region may carry wavelength conversion materials of other colors, depending on practical needs.

In the above embodiment, the light source system uses the excitation light to excite the original light region and compensation light region of the wavelength conversion layer to generate the original light and the compensation light. In practice, the original light source and compensation light source of the light source system may alternatively employ solid state light emitting devices to generate the primary color lights. This embodiment is different from the other embodiment in the following ways:

The light source system includes an original light source and a compensation light source, for respectively generating the original light and the compensation light. Each of the two light sources includes red, green and blue solid state light emitting devices, respectively generating red, green and blue light beams. In this embodiment, the solid stated light emitting devices in the light source system are light emitting diodes (LEDs). Of course, in practice the solid stated light emitting devices may alternatively be laser diodes (LD) or other solid stated light emitting devices.

The light source system further includes X shaped dichroic filter plates, where the red LEDs of the original light source and the compensation light source are located on the same optical path; likewise, the green LEDs of the original light source and the compensation optical source are located on the same light path, and the blue LEDs of the original light source and the compensation light source are located on the same optical path. The light generated by the red LEDs, the green LEDs and the blue LEDs are respectively incident to the X shaped dichroic filter plates from three sides, so that the light generated by the three colored LEDs are all output form the same optical path.

Of course, in practice, the X shaped dichroic filter plates of the light source system may be replaced by two parallel filter plates, to combine the red, green and blue colored light beams into one light beam.

The light source system further includes a control device, for controlling the turning on and off of the various solid stated light emitting devices of the original light source and compensation light source of the light source system, such that during the time period T when the optical modulation device modulates a frame of image data, within the time period t1 when the modulating device modulates the original image data, the corresponding solid stated light emitting devices of the original light source of the light source system are turned on, and within the time period t2 when the modulating device modulates the compensation image data, the corresponding solid stated light emitting devices of the compensation light source of the light source system are turned on. Of course, in practice, the control device can alternatively control the signal processor of the optical modulation device to achieve the above goal.

In this embodiment, because the light source system employs solid stated light emitting diodes, the spoke regions between adjacent segments of different colors in the wavelength conversion devices can be avoided.

In this embodiment, because the original light source and the compensation light source of the light source system are both solid stage light emitting devices, and their colors are the same, these two light sources preferably are combined as one light source, for example, the same red LEDs can serve both as the red light source of the original light source and the red light source of the compensation light source, so that the number of solid state light emitting devices can be reduced to save cost.

In this embodiment, in some implementations, other colors beside the colors included in the light source need to be compensated for. In that case, a time period t3 can be inserted into the time period when the modulating device modulates the compensation image data; during the time period t3, some of the red, green and blue LEDs are turned on, so that the combined light they emit is used as the color light that needs to be compensated for.

Because the time period used for modulating the original image light for each frame of image is shortened, the brightness of each frame of image will be lower. Therefore, in certain situations, the drive currents for the various solid state light emitting devices of the light source system may be increased, to increase the overall brightness of the image.

In the above embodiments, a projection system using the single light valve modulation technique is used as an example for purposes of explanation. Of course, in practice, a projection system using the three light valve modulation technique may alternatively be used. Based on the above explanations, those of ordinary skill in the relevant art will understand how to use projection system with three light valve modulation technique to achieve the above goals, which is not explained in further detail here.

The various embodiments in this disclosure are described in a progressive manner, where each embodiment is described by emphasizing its differences from other embodiments. The common or similar features of the embodiments can be understood by referring to each other.

The above descriptions disclose the embodiments of the present invention, but do not limit the scope of the invention. Thus, it is intended that the present invention cover modifications and variations that come within the scope of the appended claims and their equivalents, as well as direct or indirect applications of the embodiments in other related technical fields.

What is claimed is:

1. A display uniformity compensation method, comprising:
    S11: acquiring an original image data and an optical loss coefficient a of a compensation region, where a grayscale value of the original image data corresponding to an arbitrary point A in a non-compensation region of a display unit is u, and that corresponding to an arbitrary point B in the predetermined compensation region of the display unit is v;

S12: acquiring values t1 and t2, such that $t2/t1=f*a/(1-a)$, where $0<f\leq 1$, and $t1+t2=T$;

S13: acquiring values m and n, such that $m*t1/T+n*t2/T=u*t1/T$, and where at least two values among m, n and u satisfy a predetermined relationship;

S14: determining a full region image data and a compensation image data based on m, n and v, where a grayscale value of the full region image data corresponding to the point A is m and that corresponding to the point B is v, and where a grayscale value of the compensation image data corresponding to the point A is n and that corresponding to the point B is q, where $q\geq v$, and where q and v satisfy a predetermined relationship; and S15: within a time period T when a frame of image is being modulated, within a time period t1, acquiring an original light and modulating the original light according to the full region image data, and within a time period t2, which is a time period within the time period T other than the time period t1, acquiring a compensation light and modulating the compensation light according to the compensation image data.

2. The display uniformity compensation method of claim 1, wherein $t2/t1=a/(1-a)$, $q=v$, and the original light and the compensation light have same flux.

3. The display uniformity compensation method of claim 1, wherein $t2/t1<a/(1-a)$, and the original light and the compensation light have same flux; and
wherein step S14 further includes acquiring a predetermined grayscale compensation value p, where $0<p\leq [y0]$, $y0=(t1*v*a)[t2*(1-a)]-v$, and $q=v+p$.

4. The display uniformity compensation method of claim 1, wherein $t2/t1<a/(1-a)$, $n=0$, $m=u$, $q=v$, and a flux of the compensation light is d times that of the original light, where $d=(t1*a)/[t2*(1-a)]$.

5. The display uniformity compensation method of claim 1, wherein $t2/t1<a/(1-a)$, $n=0$, $m=u$, and a flux of the compensation light is d times that of the original light; and
wherein step S14 further includes acquiring a predetermined grayscale compensation value p, where $0<p\leq [y0]$, $y0=(t1*v*a)(d+t2)-v$, and $q=v+p$.

6. The display uniformity compensation method of claim 1, wherein in step S11, acquiring the optical loss coefficient a of the compensation region includes: acquiring an optical loss coefficient matrix of the compensation region, and taking an optical loss coefficient of a pixel B1 in the optical loss coefficient matrix as the optical loss coefficient a, where a grayscale value of the original image data corresponding to the pixel B1 of the predetermined compensation region of the display unit is v1, and that corresponding to an arbitrary other pixel B2 of the predetermined compensation region is v2, where the optical loss coefficient of the optical loss coefficient matrix corresponding to the pixel B1 is a1, and that corresponding to the pixel B2 is a2;
wherein $t2/t1=a/(1-a)$;
wherein step S14 further includes acquiring predetermined grayscale compensation values, where the grayscale compensation value p of the compensation image data corresponding to the pixel B1 is $p=0$, and that corresponding to the pixel B2 is $p4=[y0]$, where y0, $[t1*v2-T*v2*(1-a2)]/t2$, wherein $q=v+p$; and
wherein the original light and the compensation light have same flux.

7. The display uniformity compensation method of claim 6, wherein the optical loss coefficient of the pixel B1 is a median value of the optical loss coefficient matrix.

8. The display uniformity compensation method of claim 1, wherein $n=0$.

9. An optical modulation device, comprising:
a signal processor for: acquiring an original image data and an optical loss coefficient a of a compensation region, where a grayscale value of the original image data corresponding to an arbitrary point A in a non-compensation region of a display unit is u, and that corresponding to an arbitrary point B in the predetermined compensation region of the display unit is v; acquiring values t1 and t2, such that $t2/t1=f*a/(1-a)$, where $0<\leq 1$, and $t1+t2=T$; acquiring values m and n, such that $m*t1/T+n*t2/T=u*t1/T$, and where at least two values among m, n and u satisfy a predetermined relationship; and determining a full region image data and a compensation image data based on m, n and v, where a grayscale value of the full region image data corresponding to the point A is m and that corresponding to the point B is v, and where a grayscale value of the compensation image data corresponding to the point A is n and that corresponding to the point B is q, where $q\geq v$, and where q and v satisfy a predetermined relationship; and an optical modulator unit for: within a time period T when a frame of image is being modulated, within a time period t1, acquiring an original light and modulating the original light according to the full region image data from the signal processor, and within a time period t2, which is a time period within the time period T other than the time period t1, acquiring a compensation light and modulating the compensation light according to the compensation image data from the signal processor.

10. The optical modulation device of claim 9, wherein $t2/t1=a/(1-a)$, and $q=v$.

11. The optical modulation device of claim 9, wherein the signal processor further acquires an optical loss coefficient matrix of the compensation region, and takes the optical loss coefficient of a pixel B1 in the optical loss coefficient matrix as the optical loss coefficient a, where the grayscale value of the original image data corresponding to the pixel B1 of the predetermined compensation region of the display unit is v1, and that corresponding to an arbitrary other pixel B2 of the predetermined compensation region is v2, where an optical loss coefficient of the optical loss coefficient matrix corresponding to the pixel B1 is a1, and an optical loss coefficient corresponding to the pixel B2 is a2;
wherein $t2/t1=a/(1-a)$; and
wherein the signal processor further acquires predetermined grayscale compensation values, where a grayscale compensation value p of the compensation image data corresponding to the pixel B1 is $p=0$, and a grayscale compensation value p corresponding to the pixel B2 is $p4=[y0]$, where $y0=[t1*v2-T*v2*(1-a2)]/t2$, and $q=v+p$.

12. The optical modulation device of claim 9, wherein the optical loss coefficient of the pixel B1 is a median value of the optical loss coefficient matrix.

13. A signal processor, comprising:
a first acquiring module for acquiring an original image data and an optical loss coefficient a of a compensation region, where a grayscale value of the original image data corresponding to an arbitrary point A in a non-compensation region of the display unit is u, and that corresponding to an arbitrary point B in the predetermined compensation region of the display unit is v, and for acquiring values t1 and t2, such that $t2/t1=f*a/(1-a)$, where $0<f\leq1$, and $t1+t2=T$;

a second acquiring module for acquiring values m and n, such that $m*t1/T+n*t2/T=u*t1/T$, and where at least two values among m, n and u satisfy a predetermined relationship; and a determination module for determining a full region image data and a compensation image data based on m, n and v, where a grayscale value of the full region image data corresponding to the point A is m and that corresponding to the point B is v, and where a grayscale value of the compensation image data corresponding to the point A is n and that corresponding to the point B is q, where $q\geq v$, and where q and v satisfy a predetermined relationship.

14. A projection system, comprising:

a light source system including an original light source and a compensation light source, for respectively generating an original light and a compensation light which are output sequentially from a common light path;

an optical modulation device for: acquiring an original image data and an optical loss coefficient a of a compensation region, where a grayscale value of the original image data corresponding to an arbitrary point A in a non-compensation region of the display unit is u, and that corresponding to an arbitrary point B in the predetermined compensation region of the display unit is v; acquiring values t1 and t2, such that $t2/t1=f*a/(1-a)$, where $0<f\leq1$, and $t1+t2=T$; acquiring values m and n, such that $m*t1/T+n*t2/T=u*t1/T$, and where at least two values among m, n and u satisfy a predetermined relationship; determining a full region image data and a compensation image data based on m, n and v, where a grayscale value of the full region image data corresponding to the point A is m and that corresponding to the point B is v, and where a grayscale value of the compensation image data corresponding to the point A is n and that corresponding to the point B is q, where $q\geq v$, and where q and v satisfy a predetermined relationship; within a time period T when a frame of image is being modulated, within a time period t1, acquiring an original light and modulating the original light according to the full region image data, and within a time period t2, which is a time period within the time period T other than the time period t1, acquiring a compensation light and modulating the compensation light according to the compensation image data; and a projection lens for projecting the light beam that has been modulated by the optical modulating system to a predetermined plane.

15. The projection system of claim 14, wherein $t2/t1<a/(1-a)$, $n=0$, $m=u$, $q=v$, and a flux of the compensation light is d times that of the original light, where $d=(t1*a)/[t2*(1-a)]$.

16. The projection system of claim 14, wherein $t2/t1<a/(1-a)$, $n=0$, $m=u$, and a flux of the compensation light is d times that of the original light; and the optical modulation device further acquires a predetermined grayscale compensation value p, where $0<p\leq[y0]$, $y0=(t1*v*a)/(d+t2)-v$, and where $q=v+p$.

* * * * *